United States Patent [19]
Ashkin et al.

[11] 4,063,106
[45] Dec. 13, 1977

[54] OPTICAL FIBER RAMAN OSCILLATOR

[75] Inventors: Arthur Ashkin, Rumson; Ravinder Kumar Jain, Matawan; Chinlon Lin, Middletown; Rogers Hall Stolen, Rumson, all of N.J.

[73] Assignee: Bell Telephone Laboratories, Incorporated, Murray Hill, N.J.

[21] Appl. No.: 790,192

[22] Filed: Apr. 25, 1977

[51] Int. Cl.$^2$ ............................................. H03F 7/00
[52] U.S. Cl. ............................... 307/88.3; 331/107 R; 363/170
[58] Field of Search .................. 307/88.3; 331/107 R; 321/69 R; 335/4.5

[56] References Cited
U.S. PATENT DOCUMENTS 3,705,992  12/1972  Ippen et al. ..................... 307/88.3

Primary Examiner—Rudolph V. Rolinec
Assistant Examiner—Darwin R. Hostetter
Attorney, Agent, or Firm—Daniel D. Dubosky

[57] ABSTRACT

A tunable radiation source employing the stimulated Raman-scattering process is disclosed. The source generates several orders of Stokes radiation in an optical-fiber oscillator cavity, which Stokes radiation may be independently tuned by incorporating separate tuning elements for the several Stokes orders. Several different arrangements of fiber and tubing elements are disclosed.

13 Claims, 10 Drawing Figures

OPTICAL FIBER RAMAN OSCILLATOR

BACKGROUND OF THE INVENTION

Tunable sources of coherent radiation have been sought ever since the development of the laser, and work continues at developing new devices to provide a broader range of tunability, to provide continuous or near-continuous tuning over the range covered, or to provide better economy.

One approach used in the prior art is to extend the range of a tunable laser, such as a dye laser, toward the infrared by use of the Raman-scattering process in which one or more of a series of frequencies are produced in a single pass through a nontunable Raman-active medium such as benzene. These frequencies, called Stokes lines, have energies which are less than the energy of the generating laser beam and, in the prior art, are separated equally in energy. When the frequency of the tunable generating laser is changed, the frequencies of the Stokes lines change by an equal amount. Optical fibers were not employed by the prior art.

One disadvantage of this prior art method is that a reasonably large Raman energy shift, which is required in order to extend the frequency range covered by the device, may be greater than the tuning range of the generating laser, so that there is a gap between Stokes lines which is not accessible. Another disadvantage of this method results from the fact that the Stokes lines are equally spaced in frequency. For applications which require photons of two different energies, such as sum and difference frequency mixing to generate ultraviolet or infrared radiation, a single prior art Raman generator will be unable to supply beams of the correct energy because the several frequencies produced track the generating laser beam and are not independently adjustable. In that case, two frequency generators would be required to provide beams of the right frequencies.

Another prior art device is the fiber-optic Raman oscillator, which differs from the Raman generators mentioned above in that it is an oscillator, in which the light makes many passes through the Raman medium, and in that the Raman medium is capable of responding over a range of frequencies. Such an oscillator is disclosed in U.S. Pat. No. 3,705,992, dated Dec. 12, 1972, issued to E. P. Ippen et al, which patent is incorporated herein by reference. The use of a tuning element incorporated in the oscillator cavity (FIGS. 3 and 4 of the Ippen et al. patent) is suggested for tuning the oscillator frequency within a range of about 100 Angstroms (using a fixed-frequency pump). This device required a great deal of power (having a threshold for Stokes oscillation of 500 watts in the fiber (Col. 3, line 43)). It employed a pulsed laser, in part to achieve the high peak power that was required. The device was incapable of oscillating at more than one frequency even if sufficient power to reach the higher thresholds were available because of the structure of the device.

It was known in the prior art on the basis of single-pass measurements that production of Raman radiation in glass is weaker by a factor of more than 100 than it is for standard media such as benzene but the amount of intracavity Stokes power in a lossy cavity (having a factor of two attenuation in the fiber and another factor of two in the prisms) was not known to the prior art.

A phenomenon known to the prior art is that of superradiant emission in which Stokes radiation is generated on a single pass through a fiber, which radiation is concentrated in a subrange near the peak of the Raman gain curve that is small compared with the total Raman gain range of approximately 500 cm$^{-1}$.

SUMMARY OF THE INVENTION

The invention is a tunable radiation source employing the stimulated Raman-scattering process and resonating several orders of Stokes frequencies simultaneously in an optical-fiber oscillator cavity. These several Stokes frequencies may be tuned independently or in combination by means of appropriate tuning elements within the cavity. The invention may be practiced by means of either wavelength dispersion tuning or by means of time dispersion tuning in combination with wavelength dispersion tuning.

One feature of the invention is the unexpectedly high intra-cavity power for Stokes lines, permitting generation of even fourth order Stokes lines by means of continuous-wave radiation.

Another feature of the invention is the adjustment of those parameters of the apparatus that relate to singlepass gain and feedback so that superradiant emission is suppressed and is small relative to the emission of the desired Stokes frequencies.

Yet another feature of the invention is continuous coverage of a frequency range. Prior art multiple Stokes generators were inherently incapable of continuous coverage, while the independent tunability of our invention permits continuous coverage over most of the spectrum covered.

Yet another feature of the invention is the provision of independently tunable output radiation simultaneously at several frequencies.

Yet another feature of the invention is the provision of collinear radiation at several frequencies, eliminating not only the need for multiple lasers, but also the alignment problems associated with providing collinearity.

DETAILED DESCRIPTION

Figure 1:
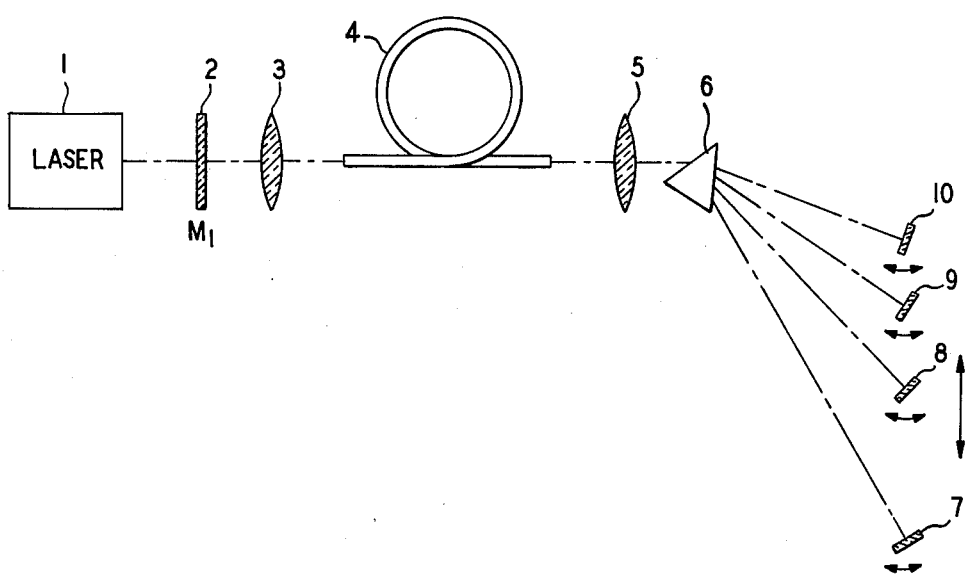
FIG. 1 shows an embodiment of the invention in which wavelength dispersion tuning is employed.

In FIG. 1, laser 1, illustratively a continuous-wave Argon laser oscillating at 5145 Angstroms, projects a beam of radiation through mirror 2, which is also the output mirror of the laser cavity. (The reflectivity of mirror 2 was 91 percent.) Lens 3, illustratively a 20X anti-reflection coated microscope objective, focuses the beam into optical fiber 4, illustratively a 100 meter long, 3.3 micrometer core diameter, silica fiber, having a borosilicate cladding. At the pump frequency, fiber 4 is essentially single mode and has a loss of approximately 17 dB per kilometer. Light energy from fiber 4 is collimated by lens 5, a microscope objective similar to lens 3. The collimated light passes through prism 6, which refracts light of different wavelengths at different angles.

In operation, mirror 7 is located at a position corresponding to the frequency desired for the first Stokes line. Mirror 7 is adjusted so that it reflects the first Stokes line back through prism 6 and lens 5 into fiber 4, where it acts as a pump to generate a second Stokes line. The same adjustment procedure is repeated with mirrors 8, 9, and 10 to produce second, third and fourth-order Stokes lines. Mirrors 7, 8, 9, and 10 are mounted so that they may be translated as indicated by the arrows in FIG. 1 and also rotated about a vertical axis as indicated by the arrows. Radiation may be extracted from the oscillator cavity by using partially transmitting mirrors on the separate tuning elements or by any of a number of methods well known to those skilled in the art, such as a beamsplitter between mirror 2 and lens 3 or between lens 5 and prism 6.

In accordance with the present invention, oscillation at frequencies outside the superradiant range may be achieved by enhancement of the oscillator gain for desired frequencies defined by tuning elements relative to the oscillator gain for untuned frequencies that are fed back by reflection off various cavity elements, such as the ends of the fibers. This untuned feedback will enhance the gain for those frequencies in the superradiant range (where single-pass production is highest). In order to tune away from this range, it is necessary that the gain at the desired frequency dominate the gain at other frequencies.

Suppression of these undesired frequencies is effected by selecting a fiber of a predetermined length and by selecting mirrors of predetermined reflectivity. The generation of Stokes radiation is generally more efficient for those frequencies in the superradiant range than for others. If the fiber is too long, the superradiant frequencies may absorb the pump strength preferentially on a single pass so that the transfer of energy from the pump to desired frequencies outside of the superradiant range is nearly or entirely balanced by the ordinary attenuation of the fiber. The reflectivity of the mirrors (and the efficiency of coupling radiation into the fiber) affects the amount of desired radiation fed back into the fiber to stimulate the generation of yet more radiation from the pump. If the feedback process is inefficient, so that not enough radiation of the desired frequency is fed back to compete with the amount of superradiant energy fed back from reflections off the end of the fiber or other sources, generation of the desired frequencies relative to the generation of superradiant radiation will suffer and the tuning range of the oscillator will be restricted.

The problems of tuned versus superradiant oscillation in long resonant fibers were not known to the prior art. Previous work had been done on short fibers (the Ippen et al. patent incorporated by reference), but the feasibility of tuning away from the superradiant peak in an apparatus where a substantial portion of the pump was depleted on the first pass was not known. It also was not known whether a first tuned Stokes line could be used as a pump for a second tuned Stokes line or whether provision would have to be made for a first superradiant band to pump a second Stokes line.

The invention has been reduced to practice in an embodiment similar to that illustrated in FIG. 1, differing in that two small prisms were substituted for prism 6, an additional mirror was used to reflect the residue of the pump beam back into the fiber, and output radiation was obtained from reflection off one of the prism faces (which were not anti-reflection coated). Pump depletion on the first pass was so high (approximately 90 percent) that the presence of the additional mirror had little effect on the output. In that apparatus, when 8 watts of 5145 Angstrom power were coupled into the fiber, four orders of Stokes radiation were seen. Typical threshold powers and tuning ranges were 2.2 watts of intracavity power and 5204 Angstroms – 5285 Angstroms for the first Stokes, 5.5 watts and 5302 Angstroms – 5418 Angstroms for the second Stokes, 11 watts and 5423 Angstroms – 5540 Angstroms for the third Stokes, and 16 watts and 5620 Angstroms – 5660 Angstroms for the fourth Stokes. Typical linewidths were approximately 1 Angstrom.

Figure 2:
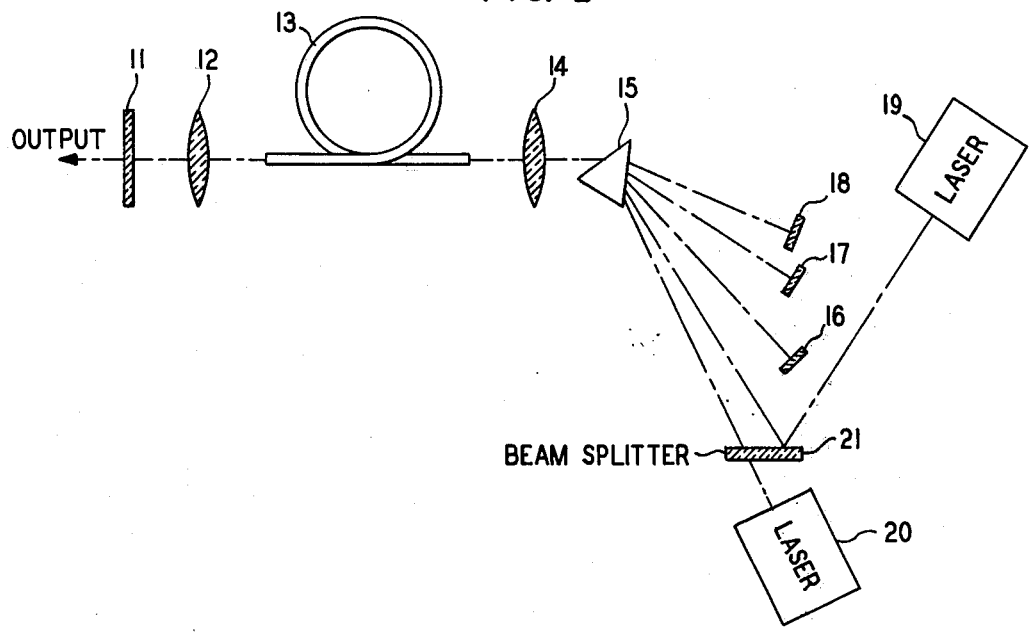
FIG. 2 shows another embodiment of the invention in which two input lasers are used.

The tuning ranges may be better understood with reference to FIG. 2 of the Ippen et al patent incorporated herein by reference. That figure shows a plot of gain versus frequency shift for three different glasses. The important feature is a broad gain from about 20 to about 550 $cm^{-1}$. The fall-off on the left side of the curve prevents a Stokes line from being tuned close to the frequency of its generating line, while the fall-off on the right side limits the tuning range provided by one Stokes line.

In operation, the $n^{th}$ Stokes line may be set within an $n^{th}$ range, the exact limit of which will depend on the power of the $(n-1)^{th}$ Stokes line that is pumping the $n^{th}$ Stokes line. The $(n+1)^{th}$ Stokes line may be set within a similar range the limits of which will depend both on the power of the $n^{th}$ Stokes line and the value of the $n^{th}$ Stokes line within its range. The values of the $(n+1)^{th}$ line cover a range from a high-frequency end (where both the $n^{th}$ and $(n+1)^{th}$ lines are set at their high-frequency limits) to a low-frequency end (where both the $n^{th}$ and the $(n+1)^{th}$ lines are at their low-frequency limits). The tuning range of the $(n+1)^{th}$ line is thus inherently broader than that of the $n^{th}$ line, and the tuning ranges of the several lines will overlap for some value of $n$ when the range of the $n^{th}$ line is greater than the inherent gap between the $n^{th}$ and the $(n+1)^{th}$ lines. The point at which overlap is achieved will depend on the medium used and the power of the pump laser, for the drop in gain shown in the curves of FIG. 2 of the Ippen et al patent may be compensated by an increase in power so that the intensity of the $n^{th}$ line is still above threshold for Stimulated Raman Scattering of the $(n+1)^{th}$ line.

An alternative embodiment of the invention that provides a more efficient means of extracting output, better efficiency for the stimulated Raman scattering process and continuous frequency coverage is shown in FIG. 2. Partially transmitting mirror 11, in common with the pump and all the Stokes lines, provides the output. Lenses 12 and 14, fiber 13, and prism 15 perform the same functions as the corresponding elements in FIG. 1. Mirrors 16, 17, and 18 tune Stokes lines. Laser 20 is the primary pump, generating Stokes lines which are tuned by mirrors 16, and 18. Laser 19 generates a second pump beam which is reflected by beamsplitter 21 into the system. The frequency of laser 19 is chosen so that the tuning range of its first Stokes line fills the gap between the first and second Stokes tuning ranges produced by laser 20. Of course, more mirrors could be added to tune higher-order Stokes lines from both lasers.

Figure 3:
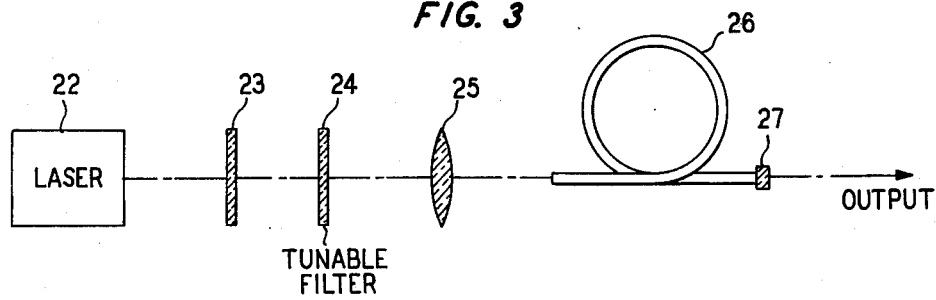
FIG. 3 shows another embodiment of the invention in which the tuning means is a Lyot filter.

FIG. 3 illustrates a different tuning mechanism and a different extraction means. Laser 22, mirror 23, lens 25, and fiber 26 function as do the corresponding elements in other embodiments. Filter 24 is a transmission filter having several bandpass frequency ranges. Examples of this type are tunable Fabry Perot filters, etalons and birefringent filters including Lyot filters, which are assemblages of birefringent elements and polarizers. The transmission bands of the filter may be adjusted to predetermined values so that the apparatus emits two or more desired frequencies useful in frequency-mixing, for example. The selected frequencies may be changed by substituting a different filter or by constructing an adjustable filter. Output mirror 27 is coated on the end of the fiber, with the result that the losses associated with coupling light back into the fiber are eliminated.

Figure 4:
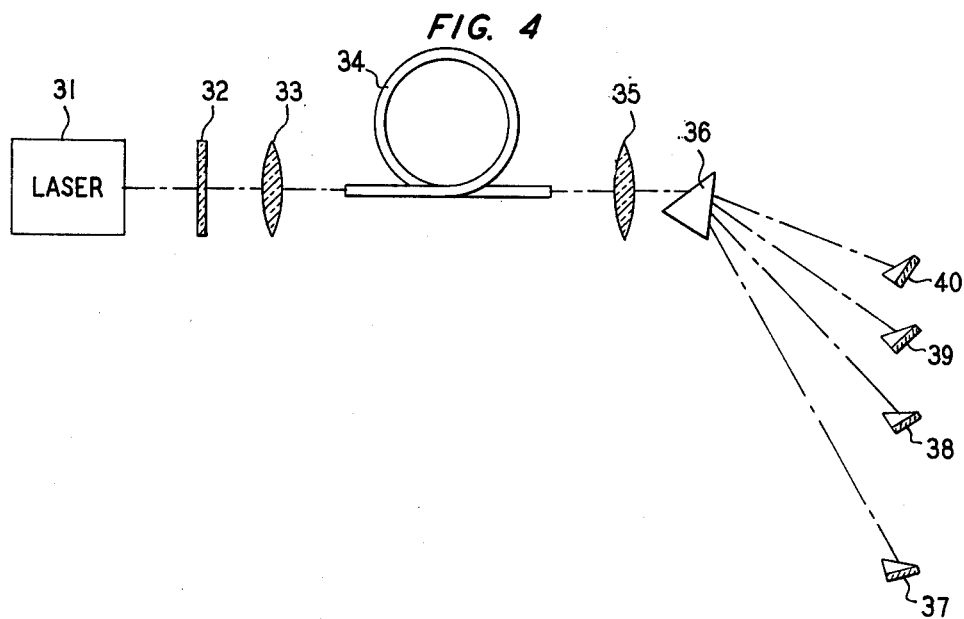
FIG. 4 shows another embodiment of the invention in which Littrow prisms are employed for tuning.

FIG. 4 illustrates another embodiment employing Littrow prisms. Laser 31, mirror 32, lenses 33 and 35, fiber 34 and prism 36 perform the same functions as are disclosed in connection with FIG. 1. The tuning elements 37–40 are Littrow prisms, with mirrors fixed to the back portion.

Figure 5:
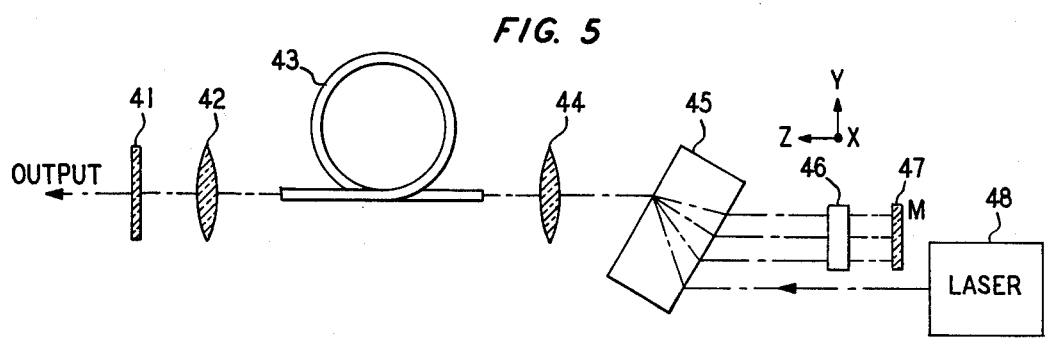
FIG. 5 shows another embodiment of the invention in which a common mirror and an aperture plate are used for tuning.

FIG. 5 shows yet another embodiment of the invention. Partially transmitting output mirror 41 reflects the pump and all the Stokes lines while transmitting a portion of these lines for the output. Lenses 42 and 44 and fiber 43 perform the same functions as do their counterparts in FIG. 1. Dispersion block 45 is a block of glass, the entrance and exit faces of which are substantially parallel.

This dispersive element 45 has the property that the several Stokes lines emerge parallel (to each other and to the beam entering the plate) so that only a single mirror 47 is required, thus making alignment of the apparatus easier, since only one mirror need be aligned and only the position (and not the angle) of the aperture plate is important. Laser 48 provides the pump beam which is parallel to the Stokes lines and located so that it is refracted by plate 45 and focused by lens 44 into fiber 43. Tuning of the Stokes lines is effected by moving aperture plate 46. Plate 46, which is moved by conventional means, not shown, contains apertures which permit the passage of selected frequencies through the system. Since all the Stokes lines are in the same plane (defined by the $\hat{y}$ and $\hat{z}$ axis in FIG. 5), the frequencies may be tuned by translating a plate such as that shown in FIG. 7 parallel to the $\hat{x}$ axis.

Figure 6:
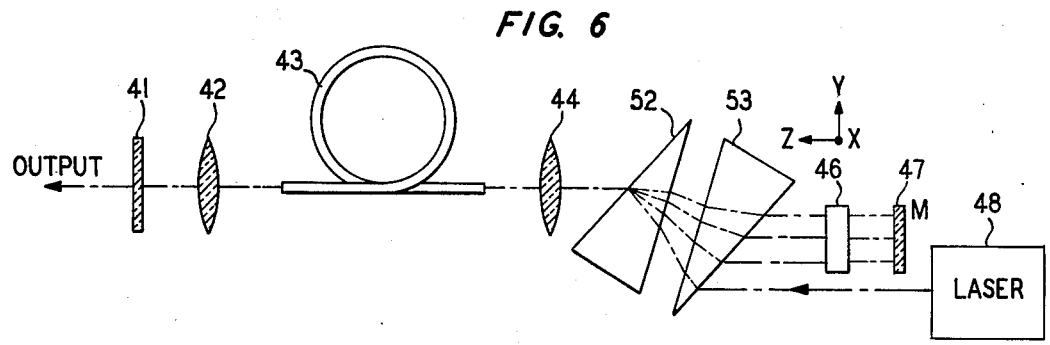
FIG. 6 shows another dispersion element for the embodiment of FIG. 5.

FIG. 6 shows another version of dispersive element 45, consisting of two identical prisms 52 and 53. This element also has the property that the output beams are parallel and offers less distortion than an equivalent glass block.

Figure 7:
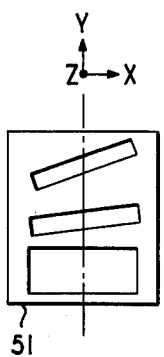
FIGS. 7 and 8 show different forms of aperture plates for use in the embodiment of FIG. 5.

FIG. 7 shows, using the same axes that are indicated in FIG. 5, an aperture plate that tunes the second and third Stokes lines. The size of the aperture is exaggerated in the figure for illustrative purposes. The large aperture at the bottom of the plate permits the first Stokes line to resonate at its natural frequency. As the aperture plate moves in the $x$ direction past the $\hat{y}$-$\hat{z}$ plane (indicated by the broken line) the middle and top apertures permit the passage of second and third Stokes radiation of varying frequencies, the relationship between the second and third Stokes frequencies being fixed by the plate.

Figure 8:
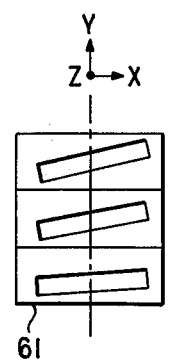

FIG. 8 shows a set of three aperture plates that permit the independent adjustment of three Stokes lines by independent translations of the plates. With FIGS. 7 and 8 as guidance, other plate configurations will be readily apparent to those skilled in the art.

In continuous-wave Raman oscillators, more power can be extracted from the cavity without sacrifice of efficient production of the desired frequencies relative to the superradiant frequencies if power is not extracted from a mirror that is used for frequency selection. If power is extracted from a tuning mirror, then the strength of the desired frequency fed back into the fiber relative to the strength of the superradiant frequencies that are always fed back by reflections from the fiber end will suffer, and the tuning range will be less broad than if power is extracted in a manner that affects all frequencies equally (such as at mirrors 11, 27, and 41).

Figure 9:
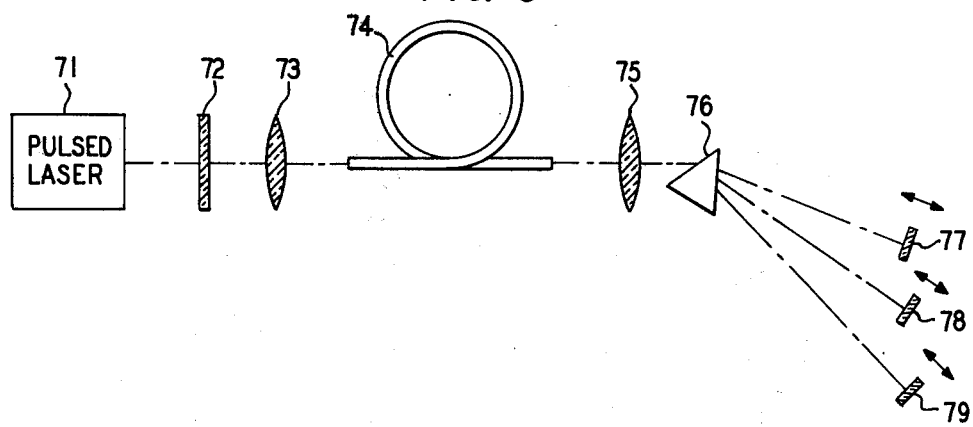
FIG. 9 shows an embodiment in which time-dispersion tuning is employed.

FIG. 9 shows an embodiment of the invention that uses time-dispersion tuning of the Stokes lines. Laser 71 is repetitively pulsed, with a maximum allowed time between pulses that is equal to the two-way transit time of radiation through the system. Mirror 72, lenses 73 and 75 and fiber 74 perform the same functions as do their counterparts in FIG. 1. Prism 76 refracts the Stokes lines by only a slight amount, enough so that separate mirrors can be used. Mirrors 77 – 79 reflect the several Stokes lines back into the fiber. Tuning of a line is effected by translating the mirror parallel to the direction of propagation of the light. Since light of different frequency travels at different speeds through glass, a given mirror position will reflect back only a certain wavelength of light at just the right time to meet a subsequent pump pulse at mirror 72. Only those wavelengths which are put in synchronism with pump pulses will be reinforced in strength during multiple passes through the fiber. Those wavelengths which are not reinforced will be attenuated in the fiber until they are of negligible strength. This time delay will of course be different for the different Stokes lines, allowing the same independence of tuning that is provided by the embodiments illustrated in FIGS. 1–7. A practical advantage of time-dispersion tuning is that it is adapted to pulsed lasers which are suitable for many applications and are usually lower in cost than continuous-wave lasers of equivalent power.

Figure 10:
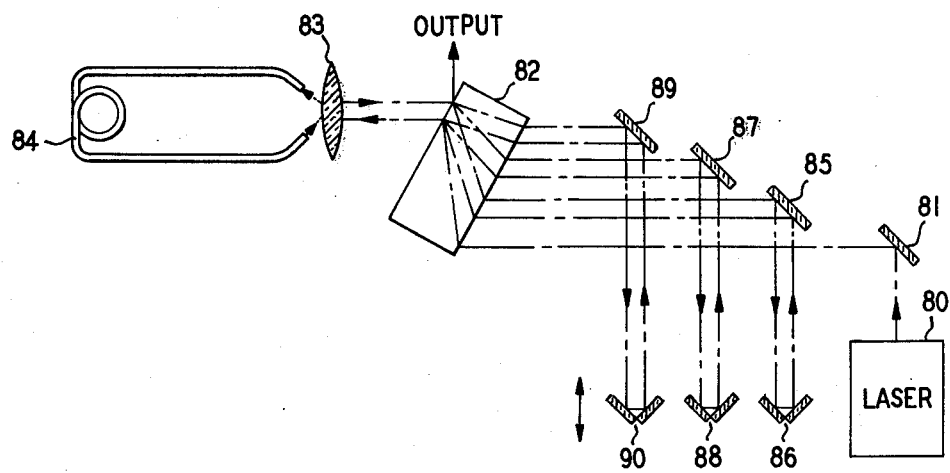
FIG. 10 shows another embodiment in which time-dispersion tuning is employed.

Another embodiment of a time-dispersion tuned radiation source is illustrated in FIG. 10. Laser 80 emits repetitive pump pulses which are reflected by mirror 81 through dispersion plate 82, and focused into fiber 84 by lens 83. The radiation emitted from the fiber is collimated by lens 83 and refracted by dispersion plate 82 which emits parallel, separated radiation, in the same manner as does dispersion plate 45 in FIG. 5.

Mirror 85 reflects the first Stokes radiation to mirror 86 comprising two surfaces at a 90° angle, which reflects back radiation parallel to and displaced from the incident radiation. Mirrors 87 and 88 and mirrors 89 and 90 perform the same functions for the second and third order Stokes radiation. Dispersion plate 82 recombines the several beams of returning Stokes radiation into a single beam directed toward lens 83 that is parallel to but displaced from the Stokes radiation traveling from lens 83 to dispersion plate 82. Lens 83 focuses this combined beam of Stokes radiation into fiber 84 along with the pump radiation. Since the same lens is used to focus and collimate beams of finite separation entering and leaving the fiber, the ends of the fiber should be tilted to angles that match the direction of propagation of the corresponding beams for the most efficient coupling. The spacing of mirrors 86, 88, and 90 is arranged so that all returning Stokes radiation enters fiber 84 in synchronism with a pulse from laser 80 so that the selected frequencies of Stokes radiation are reinforced during the next pass through fiber 84. Collinear output radiation may be obtained from that which reflects off that surface of dispersion plate 82 which faces lens 83. The embodiment of FIG. 10 differs from that in FIG. 9, in that the Stokes radiation does not make a return trip through the fiber in order to meet another pump pulse, so that attenuation is reduced; the dispersion plate separates the Stokes lines in space but maintains parallelism so that there is no problem with coupling translation and rotation when tuning the mirrors; the angles involved are 45° or 90° for easier alignment; and the arrangement of mirrors 85, 87, and 89 permits greater spacing between the tuning elements.

What is claimed is:

1. A Raman oscillator having a pump laser for generating a coherent optical pump beam and a multifrequency Raman oscillator cavity for generating Stokes radiation at at least two frequencies in response to said coherent optical pump beam, said cavity comprising:
   an optical fiber having optical waveguiding properties at the wavelengths of said optical pump beam and of said Stokes radiation,
   means for focusing radiation into said fiber and for collimating radiation emitting from said fiber, and
   means for selectively resonating simultaneously in said optical fiber radiation of at least two frequencies, whereby Stokes radiation of at least two frequencies is generated in said optical fiber and resonated in said multifrequency oscillator cavity.

2. A radiation source according to claim 1 in which said selectively resonating means includes at least one independently adjustable means, whereby at least one frequency may be adjusted within a frequency range independently of the values of other frequencies present within said fiber.

3. A radiation source according to claim 1 in which said laser emits continuous-wave radiation.

4. A radiation source according to claim 1 in which said means for selectively resonating radiation includes at least one frequency-dispersive element whereby collinear radiation of different frequencies is emitted from said dispersive element at different angles.

5. A radiation source according to claim 1 in which said means for selectively resonating radiation includes a dispersion plate, whereby beams of radiation of different frequencies entering said dispersion plate substantially collinearly are emitted from said dispersion plate spatially separated and substantially parallel.

6. A radiation source according to claim 5 in which said selectively resonating means includes an aperture plate.

7. A radiation source according to claim 1 in which said selectively resonating means includes at least one Littrow prism.

8. A radiation source according to claim 1 in which said selectively resonating means includes a tunable bandpass filter.

9. A radiation source according to claim 1 in which said laser emits repetitively pulsed radiation.

10. A radiation source according to claim 9 in which said pulsed radiation from said laser generates pulses of Stokes radiation in said fiber, in which said fiber has an input end into which said pump pulses enter, and in which said selectively resonating means feeds back said pulses of Stokes radiation into said input end having a time relationship with a subsequent pump pulse, and in which said selectively resonating means includes at least two means for varying the time relationship between a Stokes pulse and a subsequent pump pulse, whereby only Stokes pulses of desired frequencies are enhanced in amplitude by repeated passage through said fiber.

11. A radiation source according to claim 10 in which said selectively resonating means returns said Stokes pulses to said input end by a path lying outside said fiber, whereby said Stokes pulses traverse said fiber in only one direction.

12. A tunable Raman oscillator for generating tunable Stokes radiation comprising:
   a laser for generating a coherent optical pump beam,
   an optical fiber having optical waveguiding properties at the wavelength of said optical pump beam and at the wavelength of said Stokes radiation,
   a first mirror, located between said laser and said fiber, for transmitting said pump beam and for reflecting said Stokes radiation,
   means for focusing optical radiation into said fiber and for collimating optical radiation emerging from said fiber, at least two tuning mirrors for selecting and returning to said first mirror optical radiation of desired frequencies,
   frequency-dispersive means for altering the direction of propagation of said optical radiation, located between said fiber and said at least two tuning mirrors whereby said optical radiation of desired frequencies resonates between said first mirror and said at least two tuning mirrors, traversing said focusing means, said fiber and said dispersive means on each pass between said first mirror and said tuning mirrors.

13. A tunable Raman oscillator comprising:
   a pump laser for generating a pump beam,
   an optical fiber responsive to said pump beam for generating simultaneously Stokes radiation of at least two frequencies, by means of the stimulated Raman scattering process,
   means for focusing optical radiation into said fiber and for collaminating optical rediation emerging from said fiber,
   frequency-selective means for feeding back into said fiber optical radiation of at least two selected frequencies, whereby Stokes radiation of said at least two selected frequencies is resonated in said fiber.

* * * * *